No. 744,505. PATENTED NOV. 17, 1903.
R. M. DIXON.
COUPLING.
APPLICATION FILED OCT. 27, 1902.
NO MODEL.
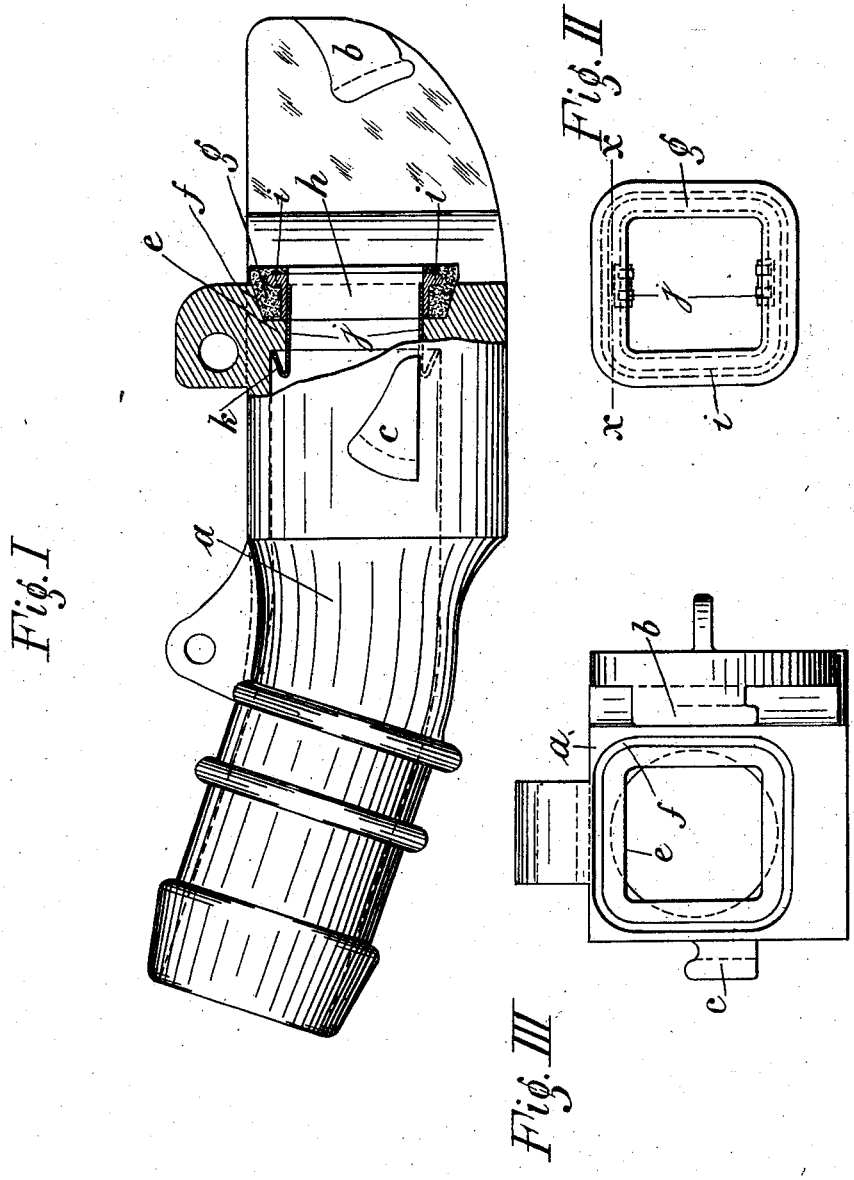

No. 744,505. Patented November 17, 1903.

UNITED STATES PATENT OFFICE.

ROBERT M. DIXON, OF EAST ORANGE, NEW JERSEY, ASSIGNOR TO SAFETY CAR HEATING & LIGHTING COMPANY, A CORPORATION OF NEW JERSEY.

COUPLING.

SPECIFICATION forming part of Letters Patent No. 744,505, dated November 17, 1903.

Application filed October 27, 1902. Serial No. 128,919. (No model.)

*To all whom it may concern:*

Be it known that I, ROBERT M. DIXON, a citizen of the United States, residing at East Orange, in the county of Essex and State of New Jersey, have invented certain new and useful Improvements in Couplers, of which the following is a specification.

My invention relates to couplers, and more particularly to what is known as the "straight-port" type of couplers, although the invention is generally applicable to couplers.

In the accompanying drawings I have shown one member of a coupling in which my invention is illustrated.

In the drawings, Figure I is a broken-away sectional view through a coupler member, hereinafter for brevity termed a "coupler;" and Fig. II is a face view of the bushing, the said bushing having a non-circular form, herein shown as rectangular. Fig. III is an end view of the coupler.

In the drawings, $a$ indicates the coupler-head, preferably provided with suitable lugs or locking means $b$ $c$. The coupler is shown as of the straight-port type. The head is apertured and provided with a rib or shoulder $e$. The face of the recess in the coupler-head is beveled, as at $f$, for the reception of the gasket structure. The gasket $g$ is preferably a composition gasket or a fiber gasket and is molded on a collar $h$, having thereon a rib $i$. Suitably secured to the collar $h$ are springs $j$, having the hooked ends $k$, which are adapted to engage in the rear of the rib or shoulder $e$ in the coupler-head.

As shown in the drawings, the recess in the coupler is not of circular form. In the present instance it is substantially square, the corners being rounded. For obvious reasons the gasket which fits within the recess is similar in shape thereto, as is likewise the frame or collar $h$.

The principal advantage of employing a gasket of the form shown is that the area for the passage of steam is increased and a long bearing-surface obtained at the top of the gasket—that is to say, when the two members of the coupling are coupled together with their gaskets in contact and are suspended by the flexible hose in the usual manner the point of application of the compression strain is at the top of the gaskets.

In Fig. II, I have shown a line $xx$, which indicates this long bearing-surface.

Having described my invention, what I claim, and desire to secure by Letters Patent, is—

1. The combination of a coupler-head and a gasket having an extended bearing-surface $x$, $x$ for receiving compression strains.

2. In a coupling, the combination of a coupler-head having a substantially rectangular orifice and a gasket of substantially rectangular form having a tapered face and seated in the said orifice.

3. In a coupling, the combination of a coupler-head, a recess for the reception of a gasket structure and shouldered internally, a gasket seated therein and presenting beveled surfaces for engagement with the said coupler-head and having an enlarged lateral bearing-surface $xx$ and a rectangular aperture therein.

R. M. DIXON.

Witnesses:
FREDERICK E. KESSINGER,
ELMER E. ALLBEE.